United States Patent [19]

Handl et al.

[11] Patent Number: 5,051,267
[45] Date of Patent: Sep. 24, 1991

[54] INSTALLATION FOR AND A METHOD OF DRYING OR RIPENING FOODSTUFFS

[75] Inventors: Karl Handl, A-6551, Pians Nr. 33; Ortwin Höllrigl, Innsbruck, both of Austria

[73] Assignee: Karl Handl, Pians, Austria

[21] Appl. No.: 391,512

[22] PCT Filed: Aug. 2, 1988

[86] PCT No.: PCT/AT88/00007
§ 371 Date: Jul. 27, 1989
§ 102(e) Date: Jul. 27, 1989

[87] PCT Pub. No.: WO88/05632
PCT Pub. Date: Aug. 11, 1988

[30] Foreign Application Priority Data

Feb. 9, 1987 [AT] Austria .................. 256/87

[51] Int. Cl.⁵ .................................. A23B 4/00
[52] U.S. Cl. .................. 426/231; 99/470; 99/474; 426/418; 426/465
[58] Field of Search ........... 426/231, 418, 419, 465; 99/467, 474, 483, 470

[56] References Cited

U.S. PATENT DOCUMENTS 3,887,716  6/1975  Seelbach .................. 426/465
4,484,517 11/1984  Amann .................... 426/418

FOREIGN PATENT DOCUMENTS 1959439  6/1971  Fed. Rep. of Germany ........ 99/474

Primary Examiner—George Yeung
Attorney, Agent, or Firm—Notaro & Michalos

[57] ABSTRACT

For drying or ripening foodstuffs with unsaturated air, the surrounding air and the exhaust air are mixed in a proportion such that the degree of humidity of the inlet air is obtained with a minimum consumption of energy. A cooler (21), a heater (22) and a fan (29) are provided in the inlet air duct (20). A linking duct (35) extends from the exhaust air duct (32) to the inlet air duct (20). All three ducts contain individually adjustable butterfly valves (30), a second fan (33) being arranged in the exhaust air duct (32) before the branching off point of the linking duct (35). Temperature and humidity measuring sensors (38,39) for the surrounding air and the outer air determine the proportion of their mixture, exclusively aimed at ensuring the desired relative humidity of the inlet air. Preferably the exhaust air duct (32) has a second cooler (34), and the quantity of heat gain in each cooler (21,34) is used to heat the inlet air when its relative humidity has to be changed.

13 Claims, 1 Drawing Sheet

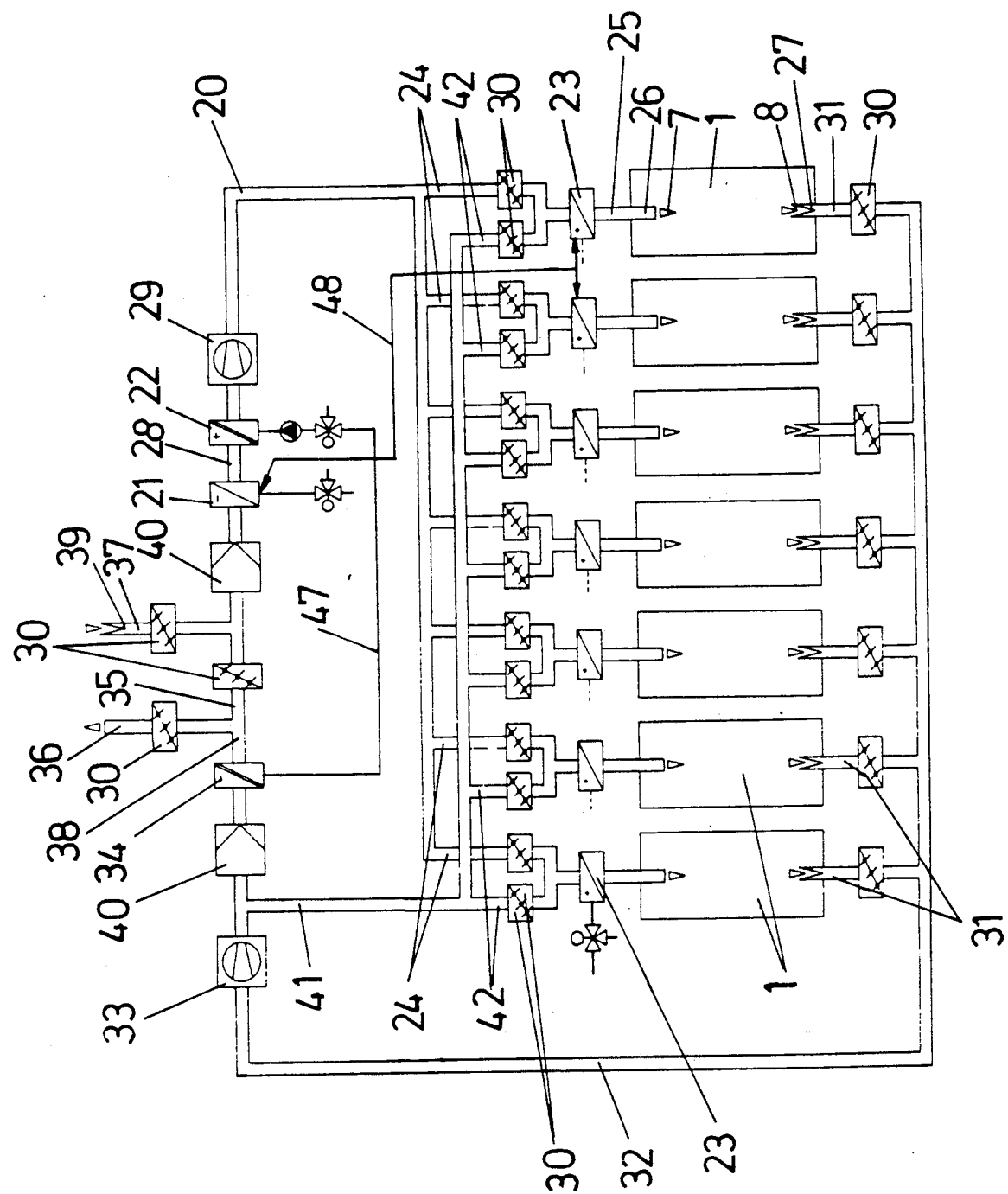

INSTALLATION FOR AND A METHOD OF DRYING OR RIPENING FOODSTUFFS

FIELD AND BACKGROUND OF THE INVENTION

The invention relates to an installation for and a method of drying or ripening foodstuffs, particularly meat products, by means of unsaturated air, with a processing room comprising a supply air duct and a waste air duct, the supply air duct being connected to an outside air supply, having a cooler, a heater and a fan, and being connected to the processing room via an air inlet duct.

For ripening and drying foodstuffs, particularly meat products, such as smoked bacon, etc., such installations are used in which particularly a gradual extraction of humidity takes place by means of conditioned air. The ripening or drying conditions are ascertained thereby from empirical values which vary according to product and region.

In order to make the process air suitable for the continuous absorption of humidity, it must first be dehumidified; this means that dry air must be fed in and moist air discharged. The rate of drying ought thereby to be governed by that water yield capacity of the substances being processed which does not produce any variations in quality. Excessive drying causes hardening of the marginal areas, the water conductivity of which drops in consequence, so that drying in the interior is impaired. Excessively slow drying, on the other hand, increases the danger of rotting and mould formation. Temperature and moisture content of the supplied air must therefore be adjusted according to the degree of drying and maturity, this being performed in a time and energy saving manner on grounds of economy. Tests along these lines were disclosed by DE-OS 34 12 107 and DE-OS 35 14 693. According to DE-OS 34 12 107 and DE-OS 35 14 693, the moisture and the temperature in the processing room are measured during processing and compared with desired values and in order to adapt the supply air to these desired values, ambient air is admixed with waste air so long as the ambient air is suitable for attaining the desired values. Cooling, heating and humidifying are only initiated when the outside air is no longer suitable. The process room in which temperature and humidity sensors are disposed comprises, for carrying out this method, one supply air duct and two waste air ducts, the first of which discharges into the supply air duct which has a closable outside air connection, while the second waste air duct discharges into the free air. In the supply air duct, following the mouth of the waste air duct, there are the cooler, a mist collector, a humidifier, a heater and the fan. Since the pressure gradient between the pressure side and suction side of the fan is greater than between the pressure side and the outside air as well as the outside air and the suction side circulation of the air enjoys priority via the first waste air duct and the supply air duct, i.e. generally, the outside air can only be admixed to a degree which is dependent upon the pressure gradient, so that the maximum potential of the outside air cannot be fully exploited. Furthermore, humidity measurement in the process room is susceptible to problems. Even the most accurate humidity measuring instruments have measurement errors of up to 10% so that per se minimal humidity differences which have to be kept low between supply air and waste air and the start and finish of the processing of the substance being processed cannot be accurately measured.

SUMMARY OF THE INVENTION

Therefore, the invention is based on the problem of providing an installation of the type mentioned at the outset, in which the admixture of outside air can be refined and optimised, so that the drying conditions can be improved and the energy consumption still further reduced.

According to the invention, this problem is resolved in that leading from the wasteair duct there is a linking duct to the supply air duct, in that in the waste air duct a second fan is arranged upstream of the branch of the linking duct, and in that the waste air discharge, the external air supply and the linking duct all contain individually adjustable shut-off valves.

Therefore, a further fan is inserted in the single waste air duct and this, in conjunction with the three individually and independently adjustable shut-off valves, permit of a substantially finer control of the air mixture and the pressure conditions. Thus, with suitable external air conditions which, as measurements have shown, are surprisingly frequent in the Central European sector, it is possible to use solely or almost exclusively outside air, the waste air being for at least the most part discharged into the free atmosphere. In a preferred embodiment, there is between the second fan and the branching of the linking duct a second cooler. By means of this second cooler, heat can be extracted from the waste air, if this is advantageous for the energy balance, the heat being preferably fed to the supply air heater. In a further preferred embodiment, finally, it is envisaged that temperature and humidity measuring sensors be disposed after the second cooler and on the outside air supply.

As already mentioned at the outset, the ripening and drying conditions are determined by empirical values. In this respect, above all the relative humidity in the supply air is a vital factor, while the temperature of the supply air is of rather subordinate importance. Whereas industrial process rooms according to the said state of the art initially have a supply air temperature of approx. 25° C., which then drops to about 15° C., the traditional method of ripening and drying in farm situations is carried out at substantially lower temperatures, mainly during the colder seasons of the year, fluctuations in temperature by themselves apparently having no great influence on the quality of the products.

Therefore, by control of an installation according to the invention, which installation comprises the above-mentioned temperature and humidity measuring sensors for outside air and cooled waste air, a further saving of energy can be achieved if the comparative values ascertain not only the mixture ratio of outside to waste air which is favourable for adapting the supply air to the given humidity sequence, but also to ascertain that temperature of the supply air from the possible working temperature range at which adaptation of the humidity to the given sequence of humidity desired values necessitates the minimum use of energy, the heat recovered from the second cooler being incorporated into calculation of the energy balance. For example, if it is found that the moist waste air can be so mixed with outside air that this latter has the desired value of relative humidity at a temperature which is within the range in question, then according to the invention, no energy is required for heating or cooling, i.e. energy is saved in comparison with prior art methods which also establish a desired temperature value. But also less additional energy is required if the desired degree of moisture cannot be achieved by purely mixing, since then cooling or heating only has to run until such time as the supply air satisfies the desired humidity value, a desired temperature value not being incorporated according to the invention. The installation according to the invention therefore requires no humidifying means, since excessively dry supply air can, by cooling in the first or in the second cooler, always be sufficiently cooled that the desired relative humidity is present in a process temperature. Furthermore, it has been found advantageous to incorporate a second heater in the air inlet duct into the process room. This simplifies control throughout the entire process time in so far as a minimum process temperature is fixed for the supply air which is, for example, around 12°, at which the supply air has the maximum amount of moisture content needed. This supply air humidity is thereby preset in the above-described manner by the two coolers, the adjustable shut-off valves and the first heater. The variation in moisture content is then achieved solely via the second heater and is thus solely temperature controlled, temperature measurement alone being very accurate. Since experience shows that from the start of the process on the amount of moisture given off by the products being process, for example smokey bacon, rises rapidly, and then gradually drops with effect from the second to third day of processing, the process temperature will move from an initially low level on the second or third day and assume its maximum level and then fall again in order to adapt the water absorption of the air to the release of water corresponding to the unimpeded capillary movement of water through the products being processed. Since the relatively cool supply air with a maximum humidity content, as practical trials have shown, can in most cases be prepared without the use of auxiliary energy, heating is necessary for only a brief period of time, the necessary heat energy for the second heater being as far as possible recovered from the cooling which may be carried out in one or both coolers.

Sub-dividing the heating of the supply air by using a first advantage: in large-scale installations, continuous production of ripened products in most cases requires their being spread over several process rooms in which ripening is at different stages so that, for example, every third day one batch of products is available. According to the state of the art mentioned at the outset, it will be necessary for each process room to have its own independently controlled installation. Dividing the process according to the invention into two spaced-apart heating zones makes it possible for the processing of goods distributed over several process rooms, for the supply air duct to be divided into an appropriate number of branch pipes after the first fan, each branch pipe having an adjustable shut-off valve, and a second heater being provided in each air inlet duct. Particularly for this embodiment it is envisaged that the or each air outlet orifice into the waste air duct have its own temperature measuring sensor so that for each process room it is possible to determine the amount of moisture given off by the products, from a comparison of the desired value with the actual value of the uncooled waste air temperature, the temperature difference being used as a further control variable for the supply air temperature. In this respect, the supply air temperature is adjusted solely by each second heater, so that each partial flow can be individually brought to the moisture content needed for the material being processed.

BRIEF DESCRIPTION OF THE DRAWINGS

Hereinafter, the invention will be described in greater detail with reference to the attached drawing, without being confined to it. This drawing diagrammatically shows an installation according to the invention, which has seven process rooms.

DESCRIPTION OF THE PREFERRED EMBODIMENT

The process rooms 1 have in each case an air inlet duct 25, with an air inlet 7 with which a temperature sensor 26 is associated and an air outlet duct 31, with an air outlet 8 with which a temperature sensor 27 is likewise associated.

The air outlet ducts 31 which are individually regulable by means of an adjustable shut-off valves 30, discharge into a waste air duct 32 which comprises a second fan 33. The supply air is fed from a supply air duct 20 to the air inlet ducts 25 and emerging from the air duct 20 are branch pipes 24 which likewise each contain a shut-off valve 30, each branch pipe leading to a second heater 23 adjacent to which is the air inlet duct 25. Following on from the second fan 33, there is branching off the waste air duct 32, a waste air admixture duct 41 which has one branch pipe 42 for each process room 1, the branch pipe 42 being provided with a shut-off valve 30 and discharging into the supply air branch pipe 24 between the shut-off valve 30 of the supply air branch pipe 24 and the second heater 23. By means of the waste air admixture duct 41, moist waste air can be passed directly into the process rooms 1, for example for a possibly desired heating of freshly introduced products, with no elimination of moisture.

Following the connection of the waste air mixer duct 41, there are inserted into the waste air duct 32 an air filter 40 and then a second cooler 34. Afterwards, there is a temperature and humidity meter 38 and a branch of a linking duct 35. The finally outwardly leading waste air discharge 36 contains a further adjustable shut-off valve 30. The linking duct 35 which is likewise provided with an adjustable shut-off valve 30 discharges into the supply air duct 20 which has a likewise closable outside air feed 37, at the input of which there is a second temperature and humidity meter 39. After the mouth of the connecting or linking duct 35, the supply air duct 20 is provided with a filter 40, a first cooler 21, a first heater 22 and a first fan 29. Between the first cooler 21 and the first heater 22 there is a further temperature measuring sensor 28 which ascertains the temperature differential with reference to a desired value of a minimum process temperature.

Via the indicated link 47, heat recovered from the second cooler 34 is also used for heating the supply air in the heater 22. A link 48 serves to transmit heat recovered from the first cooler 21 to the heater or second heater 23. As shown in the drawings, a point of intersection between the connections 47 and 48 can be provided, so that heat recovered from the first or second cooler 21, 34 can be fed optionally to the first or second heater 22, 23. The shut-off valves 30 in the waste air discharge 36, in the outside air feed 37 and in the link duct 35 serve jointly with the two fans 29, 33 to achieve the most favourable general supply air parameters which are ascertained by the two temperature and humidity meters 38, 39 for waste air and outside air. The temperature measuring sensor 29 in the air outlet duct ascertains from the variation in waste air temperature the amount of humidity given off by the substances being processed, in comparison with a desired value, and this variation is used as a further value to regulate an individual supply air temperature. Humidity measurement in the process room is therefore unnecessary, since the humidity can be established substantially more accurately by measurement of the temperature and can also be more accurately regulated by varying the temperature.

Practical tests have revealed not only considerable energy savings but also a shortening of the overall ripening time. In both cases, the values were about 25% and an excellent quality of products could be achieved.

It should also be mentioned that the plant according to the invention can be used for smoking, particularly for cold smoking, the smoke either being fed into and discharged from the process room quite separately or utilising the air system.

We claim:

1. An installation for drying or ripening foodstuffs by means of unsaturated air, comprising a process room (1) having a supply air duct (20) and a waste air duct (32), the waste air duct (32) being connected to a waste air discharge (36), the supply air duct being connected to an outside air supply (37) and having a first cooler (21), a first heater (22) and a first fan (29) therein, and being connected via an air inlet duct (25) to the process room (1), a linking duct (35) connected between the waste air duct and the supply air duct (20), a second fan (33) in the waste air duct (32) upstream of the linking duct (35), and an individually adjustable shut-off valve (30) in each of the waste air discharge (36), the outside air supply (37) and the linking duct (35).

2. An installation according to claim 1, including a second cooler (34) between the second fan (33) and the linking duct (35).

3. An installation according to claim 2, wherein the second cooler (34) is connected to the first heater (22) so that heat exchange occurs between them.

4. An installation according to claim 2 wherein downstream of the second cooler (34) and on the outside air supply (37) there is in each case a temperature and humidity measuring sensor (38, 39).

5. An installation according to claim 1, wherein a second heater (23) is incorporated into the air inlet duct (25) into the process room (1).

6. An installation according to claim 5, including a plurality of processed rooms (1) each with a separate air inlet duct (25), the supply air duct (20), downstream of the first fan (29), being sub-divided into a corresponding number of branch pipes (24), each branch pipe (24) including an adjustable shut-off valve (30), and a second heater (23) being provided in each air duct (25).

7. An installation according to claim 5, wherein the second heater (23) is connected to the first cooler (21) in such a way that there is a heat exchange between them.

8. An installation according to claim 5, including a second cooler (34) between the second fan (33) and the linking duct (35), a waste air mixing duct (41) branching from the waste air duct (32) between the second fan (33) and the second cooler (34), the waste air mixing duct (41) being connected to the second heater (23), and a shut-off valve (30) in the waste air mixing duct (41) upstream of the second heater (23).

9. An installation according to claim 1, including an air outlet orifice (8) in the process room (1) communicating with the waste air duct (32), and a temperature measuring sensor (27) adjacent the air outlet orifice (8).

10. A method for the drying or ripening of foodstuffs in a process room, comprising, supplying outside air at a first temperature and first humidity to the process room, removing waste air from the process room, the waste air containing an amount of moisture given off by the foodstuffs in the processed room, cooling the waste air to remove a quantity of heat from the waste air, the cooled waste air having a second temperature and second humidity, comparing the first temperature and first humidity with the second temperature and second humidity to obtain a difference value, changing the temperature of the outside air being supplied to the process room, and mixing part of the waste air, before it is cooled, with the outside air before the outside air is supplied to the process room, the amount of waste air mixed with the outside air being selected as a function of the difference value and to minimize an amount of energy needed to change the temperature of the outside air being supplied to the process room for achieving the removal of a desired amount of moisture from the foodstuffs.

11. A method according to claim 10, including increasing the amount of waste air mixed with the outside air supplied to the process room for increasing the humidity of air supplied to the process room and secondarily heating the mixed waste air and outside air before it reaches the process room to a temperature which produces a desired humidity in the mixed air before it is supplied to the process room.

12. A method according to claim 10, including measuring the amount of moisture given off by the foodstuffs into the waste air by comparing a desired temperature value for the uncooled waste air with an actual temperature value of the uncooled waste air to obtain a temperature difference, and using the temperature difference to control the temperature of the outside air supplied to the process room for removing a desired amount of moisture from the foodstuffs.

13. A method according to claim 10, including heating the outside air before it is supplied to the process room using heat generated by cooling the waste air.

* * * * *